United States Patent
Nagarajan et al.

(10) Patent No.: US 10,540,438 B2
(45) Date of Patent: Jan. 21, 2020

(54) COGNITIVE FRAMEWORK TO DETECT ADVERSE EVENTS IN FREE-FORM TEXT

(71) Applicant: International Business Machines Corporation, Armonk, NY (US)

(72) Inventors: Meenakshi Nagarajan, San Jose, CA (US); Cartic Ramakrishnan, San Jose, CA (US); Sheng Hua Bao, San Jose, CA (US); Nakul Chakrapani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 15/852,340

(22) Filed: Dec. 22, 2017

(65) Prior Publication Data

US 2019/0197097 A1   Jun. 27, 2019

(51) Int. Cl.
| | | |
|---|---|---|
| *G06F 17/27* | (2006.01) | |
| *G10L 13/08* | (2013.01) | |
| *G06N 20/00* | (2019.01) | |
| *G06F 16/30* | (2019.01) | |
| *G06F 16/95* | (2019.01) | |
| *G06Q 10/06* | (2012.01) | |

(52) U.S. Cl.
CPC .............. *G06F 17/27* (2013.01); *G06F 16/30* (2019.01); *G06F 16/95* (2019.01); *G06N 20/00* (2019.01); *G10L 13/08* (2013.01); *G06Q 10/063* (2013.01)

(58) Field of Classification Search
CPC combination set(s) only.
See application file for complete search history.

(56) References Cited

U.S. PATENT DOCUMENTS

| | | | |
|---|---|---|---|
| 9,075,796 B2 | 7/2015 | Markatou et al. | |
| 9,552,548 B1 | 1/2017 | Brestoff | |
| 2015/0067833 A1 | 3/2015 | Verma et al. | |
| 2016/0092793 A1* | 3/2016 | Garrow ................. | G06F 19/326 706/12 |
| 2018/0157644 A1* | 6/2018 | Mandt ................... | G06F 17/277 |

OTHER PUBLICATIONS

Ioannis Korkontzelo, Azadeh Nikfarjam, Matthew Shardlowa, Abeed Sarker, Sophia Ananiadou and Graciela H. Gonzalez, "Analysis of the effect of sentiment analysis on extracting adverse drug reactions from tweets and forum posts," Journal of Biomedical Infonnatics 62 (2016) 148-158.

Harsha Gurulingappa, Abdul Mateen-Rajput2 and Luca Toldo, "Extraction of potential adverse drug events from medical case reports," Journal of Biomedical Semantics 2012, 3:15, 10 pages.

(Continued)

*Primary Examiner* — Abul K Azad
(74) *Attorney, Agent, or Firm* — Patterson + Sheridan, LLP (57) ABSTRACT

Performing an operation comprising extracting, from an input comprising unstructured electronic text, a plurality of feature values for a plurality of features defined in a feature vector, identifying, based on a machine learning (ML) model applied to the plurality of feature values, a portion of the electronic text corresponding to an adverse event, and annotating the portion of the electronic text with an indication of the identified adverse event.

20 Claims, 7 Drawing Sheets

(56) References Cited

OTHER PUBLICATIONS

"Machine Learning Based Predictive Model for Analysing the Sentiments in Short Text", Authors et. al.: Kumar, Naveen, Majumdar, Tapas, IP.com Number:IPCOM000239081D IP.com Electronic Publication Date: Oct. 10, 2014.

"Automatic Categorization of IT Infrastructure Service Management Data using Natural Language Processing and Machine Learning," Authors et. al.: Disclosed Anonymously IP.com Number: IPCOM000245200D IP.com Electronic Publication Date: Feb. 18, 2016.

"Identification of Relevant Content for ICD-10 Coding in Electronic Health Records," Authors et al.: Disclosed Anonymously IP.com Number: IPCOM000245413D IP.com Electronic Publication Date: Mar. 8, 2016.

* cited by examiner

COGNITIVE FRAMEWORK TO DETECT ADVERSE EVENTS IN FREE-FORM TEXT

BACKGROUND

The present invention relates to computing, and more specifically, to a cognitive computing framework to detect adverse events in free-form text.

Often, words have different meanings, or meanings that can vary based on the context in which they are used. For example, the word "blue" written in text may refer to a color, or to a personal emotion. As such, computing systems are unable to detect new words and/or words with varying meanings in free-form text with high accuracy. This problem is exacerbated in certain disciplines, such as pharmacovigilance, where, for example, the term "headache" may be associated with a symptom of a disease, an adverse event experienced after taking medicine, a precondition, and/or a slang term unrelated to medicine altogether (e.g. a nuisance).

SUMMARY

According to one embodiment, a computer-implemented method comprises extracting, from an input comprising unstructured electronic text, a plurality of feature values for a plurality of features defined in a feature vector, identifying, based on a machine learning (ML) model applied to the plurality of feature values, a portion of the electronic text corresponding to an adverse event, and annotating, by a computer processor, the portion of the electronic text with an indication of the identified adverse event.

In another embodiment, a system comprises a processor and a memory containing a program which when executed by the processor performs an operation comprising extracting, from an input comprising unstructured electronic text, a plurality of feature values for a plurality of features defined in a feature vector, identifying, based on a machine learning (ML) model applied to the plurality of feature values, a portion of the electronic text corresponding to an adverse event, and annotating, by a computer processor, the portion of the electronic text with an indication of the identified adverse event.

In another embodiment, a non-transitory computer readable medium stores instructions, which, when executed by a processor, performs an operation comprising extracting, from an input comprising unstructured electronic text, a plurality of feature values for a plurality of features defined in a feature vector, identifying, based on a machine learning (ML) model applied to the plurality of feature values, a portion of the electronic text corresponding to an adverse event, and annotating, by a computer processor, the portion of the electronic text with an indication of the identified adverse event.

DETAILED DESCRIPTION

Embodiments disclosed herein provide techniques to identify mentions of adverse events in free-form text using a feature extraction phase that is decoupled from the training of a machine learning (ML) model. Generally, an adverse event is any unfavorable, undesired, and/or unintended medical occurrence in a person administered a pharmaceutical product. The adverse event may or may not have a causal relationship with the treatment. To detect terms corresponding to adverse events in free-form text, embodiments disclosed herein combine machine learning and natural language processing (NLP) techniques to train an ML model for sequential labeling of tokens (e.g., one or more words) that indicate an adverse event. The ML model is trained on features obtained from a linguistic analysis of text, word embeddings, and a morphological, statistical analysis of a text corpus. The features may include domain-specific features, organization-specific features, and hybrid features. Once trained, the ML model can accurately detect and annotate adverse events in free-form text.

Figure 1:
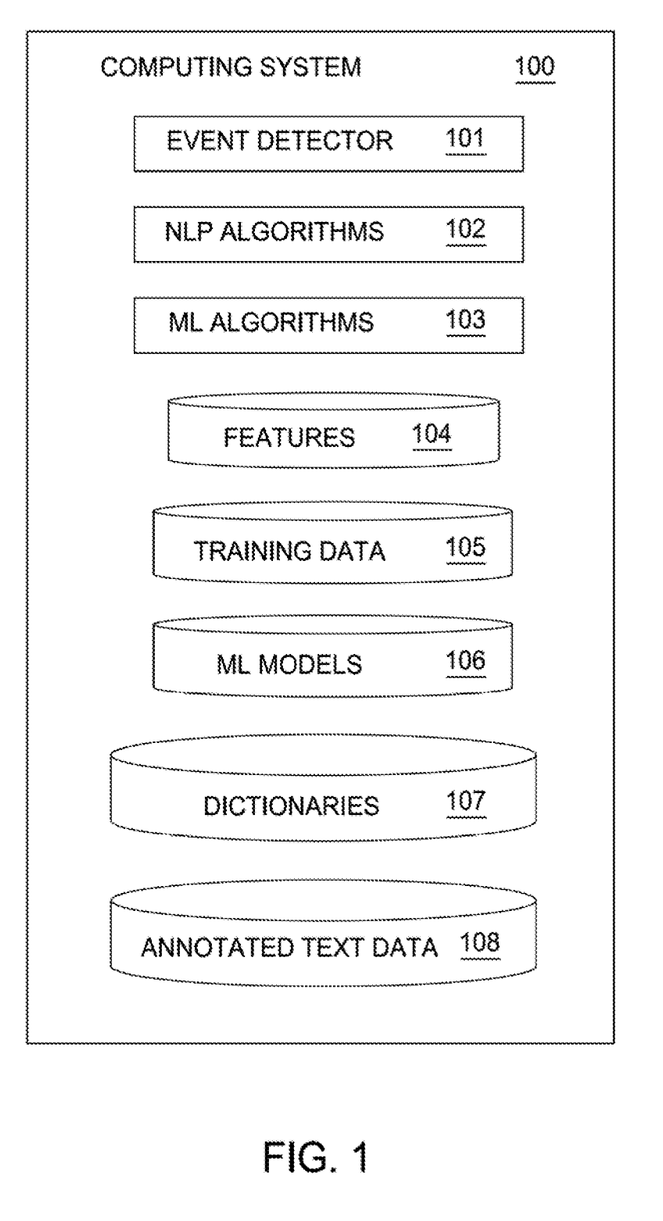
FIG. 1 illustrates a system which applies a cognitive framework to detect adverse events in free-form text, according to one embodiment.

FIG. 1 illustrates a computing system 100 which applies a cognitive framework to detect adverse events in free-form text, according to one embodiment. As shown, the computing system 100 includes an event detector 101, one or more NLP algorithms 102, one or more ML algorithms 103, and data stores of features 104, textual training data 105, ML models 106, dictionaries 107, and annotated text data 108. The event detector 101 is configured to detect adverse events in free-form text based on the features 104 and/or ML models 106. The event detector 101 may also orchestrate the generation of the features 104 during a feature extraction phase and/or the ML models 106 during a training phase. The NLP algorithms 102 are representative of any type of NLP algorithm, such as parsers, tokenizers, and any other type of algorithm that can extract feature data from text. The ML algorithms 103 are representative of any type of ML algorithm, which is generally a type of artificial intelligence that automatically learns and improves accuracy of predictions (e.g., detecting terms corresponding to adverse events in free-form text) without being explicitly programmed to do so.

Generally, the features 104 represent attributes of the text in the training data 105. One or more features 104 may collectively form an n-dimensional feature vector for a given element of text in the training data 105. The features 104 may represent any attribute of the text, such as part of speech, frequency of word occurrences, frequency of co-occurrences between two or more words, and the like. The features 104 may further include domain-specific features (e.g., to detect contraindications in the medical domain), organizational-specific features (e.g., custom features defined in a specific organization), and hybrid features (e.g., a combination of two or more features). The training data 105 is a corpus of electronic text data from any source. For example, the training data 105 may include electronic documents, social media publications, medical literature, clinical trials, emails, and the like. The ML models 106 generally include data describing attributes of the text in the training data 106. The dictionaries 107 may include predefined terms that are known adverse events, which may be used when extracting the features 104. The annotated text data 108 is text data that has been annotated with indications of adverse events by the ML models 106.

The event detector 101 may process the text of the training data 105 using one or more NLP algorithms 102 and/or ML algorithms 103 to generate the features 104 for the training data 105. The NLP algorithms 102 and/or ML algorithms 103 may include algorithms that analyze the linguistic attributes of the text, generate word embeddings describing the text, generate parse trees describing the text, and the like. One or more ML algorithms 103 may then cluster the word embeddings, and cluster identifiers are used as word surrogates to generate broader features 104. For example, a dependency parse tree generated for a sentence may include a dependency arc that connects two words via a dependency arc. The dependency arc connecting the two words is a single feature that can be transformed by replacing the words with their corresponding cluster identifier. The feature 104 that is defined using the cluster identifiers is more generalized, as the feature 104 applies to words whose vectors are clustered into the clusters defined by the feature, rather than the more narrow feature 104 defined by the pair of words that were associated via the dependency arc.

Once the features 104 are defined, the ML algorithms 103 may generate one or more ML models 106 during a training phase based on the training data 105 and/or the features 104. The ML models 106 may specify feature weights for the features 104, where the feature weights are learned by the ML algorithms 103 during the training process. For example, if the adverse event of "pain" frequently occurs within a 3 word window of a body part, the ML model 106 may specify a feature weight that may result in a greater likelihood in identifying the term "pain" as an adverse event in text. Therefore, when processing text, the ML model 106 may apply a greater feature weight to instances of the word "pain" occurring within the 3 word window of a body part, resulting in a greater likelihood that these instances of the word "pain" are identified as an adverse event. However, instances of the word "pain" that do not occur within the 3 word window of a body part may be less likely to be identified as an adverse event in text.

Once generated, the ML models 106 may be used to identify and annotate adverse event in text (e.g., in the training data 104, or text subsequently received as input, such as a newly published document or social media posting). When an adverse event is detected in the text, the event detector 101 may annotate the text with an indication of the adverse event, which can be stored for later use and/or analysis.

Figure 2:
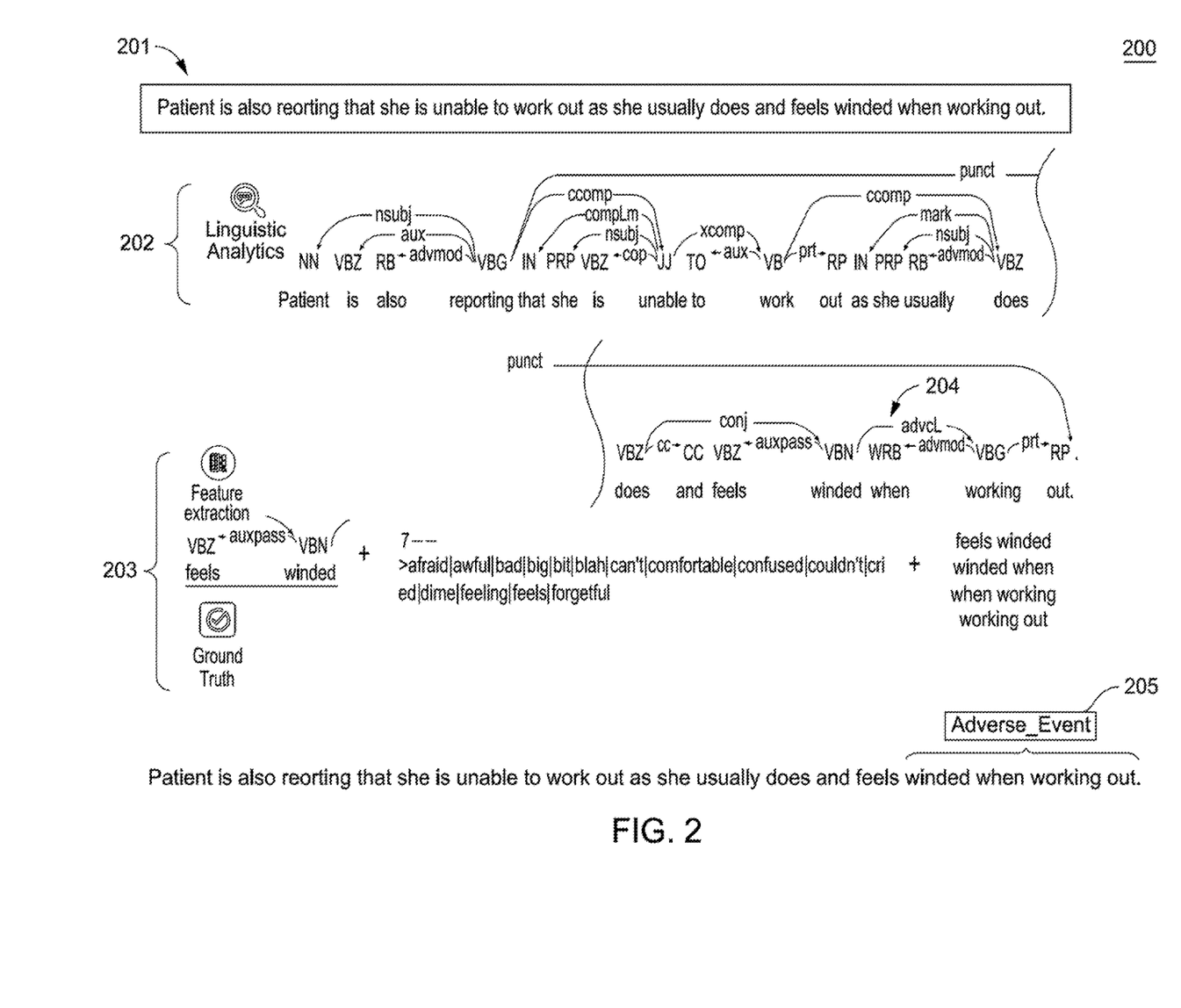
FIG. 2 illustrates an example graphical user interface depicting the of using a cognitive framework to detect adverse events in free-form text, according to one embodiment.

FIG. 2 illustrates an example graphical user interface (GUI) 200 depicting the use of using a cognitive framework to detect adverse events in free-form text, according to one embodiment. Generally, the GUI 200 depicts the analysis of an example input sentence 201 of text to detect one or more instances of an adverse event after the features 104 have been defined and the ML models 106 have been generated. As shown, the input sentence 201 reads "Patient is also reporting that she is unable to work out as she usually does and feels winded when working out." In analysis phase 202, the event detector 101 performs linguistic analysis of the input sentence 201, which generally includes determining the linguistic features of the input sentence 201. For example, in the analysis phase 202, the event detector 101 may apply NLP algorithms 102 to tokenize each word in the sentence, detect relationships between each word in the sentence, generate a parse tree representing the sentence, and the like.

In the feature extraction phase 203, the event detector 101 extracts features 104 from the input sentence 201 based on the NLP algorithms 102 and/or the ML algorithms 103. The features 104 may include word embedding vectors, context-based features, word occurrences, word co-occurrences, and the like. The context-based features 104 may generally define the context of a given word in the sentence 201. For example, the word embedding vector (which considers a given word and any surrounding words) may be a first context feature 104, while a second context feature 104 is derived from dependency parses. To determine the second context feature 104, the event detector 101 applies an NLP algorithm 102 to compute dependency parses for the input sentence 201, and count the most frequently occurring dependency patterns in the input sentence 201. The dependency parses and patterns may then be used as a definition of context, and the event detector applies one or more ML algorithms 103 to compute a second set of word embedding vectors as context features 104 that assess functional similarity between words in the input sentence 201, rather than topical similarities introduced by the first context feature 104 (e.g., the word embeddings). The event detector 101 may then apply a clustering ML algorithm 103 that clusters the second set of word embedding vectors. Doing so assigns each word embedding vector into one of a plurality of clusters. The event detector 101 may then use the identifiers of the clusters as surrogates for each word embedding vector to proliferate other features 104 for the input sentence 201. For example, the relationship 204 depicted in FIG. 2 between "winded when" and "working out" may be a first feature 104 that defines a dependency between the two phrases. However, by clustering the terms (or phrases) and replacing the words (or phrases) with cluster identifiers, the event detector 101 generates a broader feature 104 that defines a dependency between all terms (or phrases) that fall into the respective clusters. For example, such a feature 104 defines a dependency with all terms that are clustered into the same cluster as "winded when" to all terms that are clustered into the same cluster as "working out".

The event detector 101 may then detect an adverse event of "winded when working out" in the input sentence 201 based on the linguistic analysis 202, feature extraction 203, and the ML models 106. Generally, the event detector 101 applies the ML models 106 to the features 104 of the input sentence 201, which identifies "winded when working out" as an adverse event. Doing so improves the functioning of the system 100, by allowing the system 100 to identify adverse events in free-form text. As shown, the event detector 101 has annotated the text of the input sentence 201 with an indication 205 of the detected adverse event.

Figure 3:
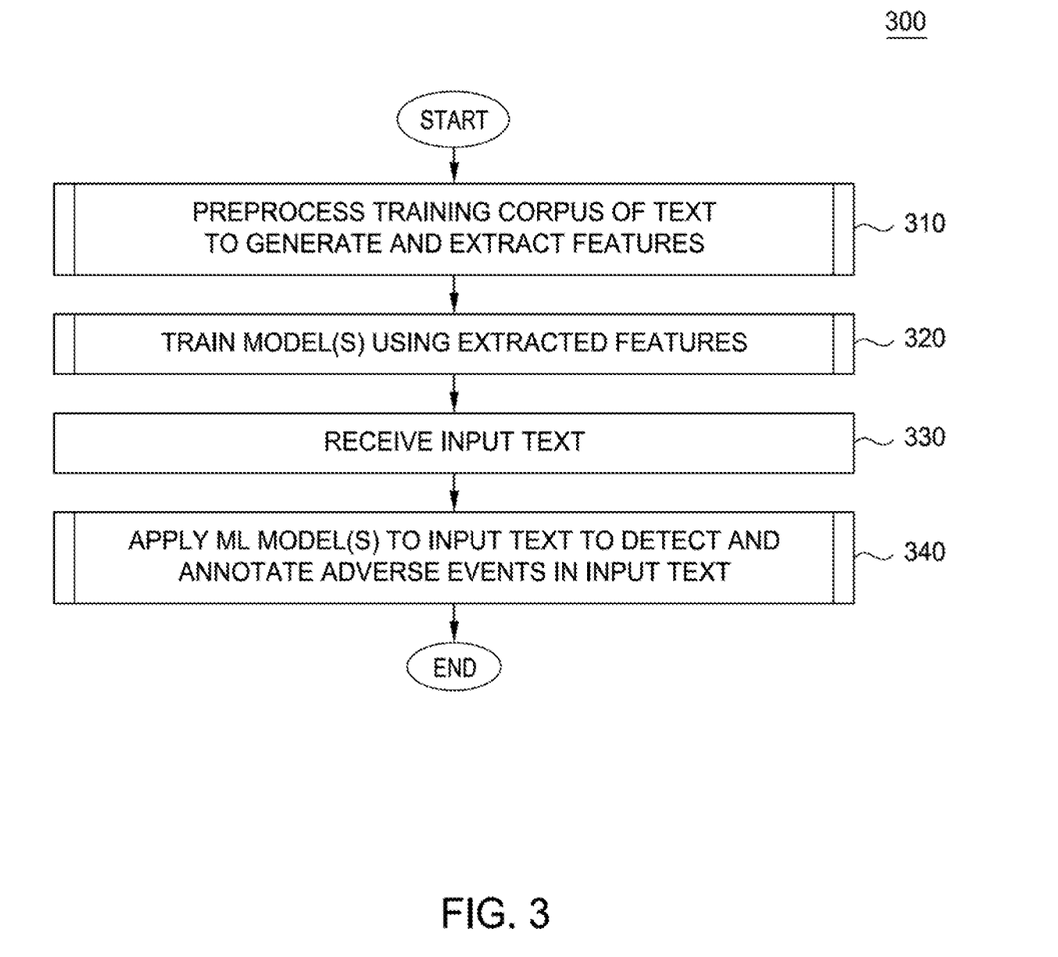
FIG. 3 illustrates a method to provide a cognitive framework to detect adverse events in free-form text, according to one embodiment.

FIG. 3 illustrates a method 300 to provide a cognitive framework to detect adverse events in free-form text, according to one embodiment. As shown, the method 300 begins at block 310, described in greater detail with reference to FIG. 4, where the event detector 101 preprocesses the training data 105 to generate and extract the features 104. Generally, the preprocessing includes applying one or more NLP algorithms 102 and/or ML algorithms 103 to identify grammatical features, linguistic features, and any other type of feature 104 describing the text of the training data 105, where the features 104 generally describe attributes of adverse events as they appear in free-form text.

At block 320, described in greater detail with reference to FIG. 5, where one or more ML algorithms 103 train one or more ML models 106 based on the features 104 and the textual training data 105. Generally, the ML models 106 specify different weights for different features 104. Doing so facilitates detection of adverse events in text by applying the weights specified in the ML models 106 to the features of a given element of input text. At block 330, electronic text (e.g., the text of the training data 105 and/or other electronic text, such as social media publications, emails, etc.) is received as input. At block 340, described in greater detail with reference to FIG. 6, the ML models 106 are applied to the received input text to detect and annotate adverse events in the input text. The annotated input text may then be stored in the annotated text data 108.

Figure 4:
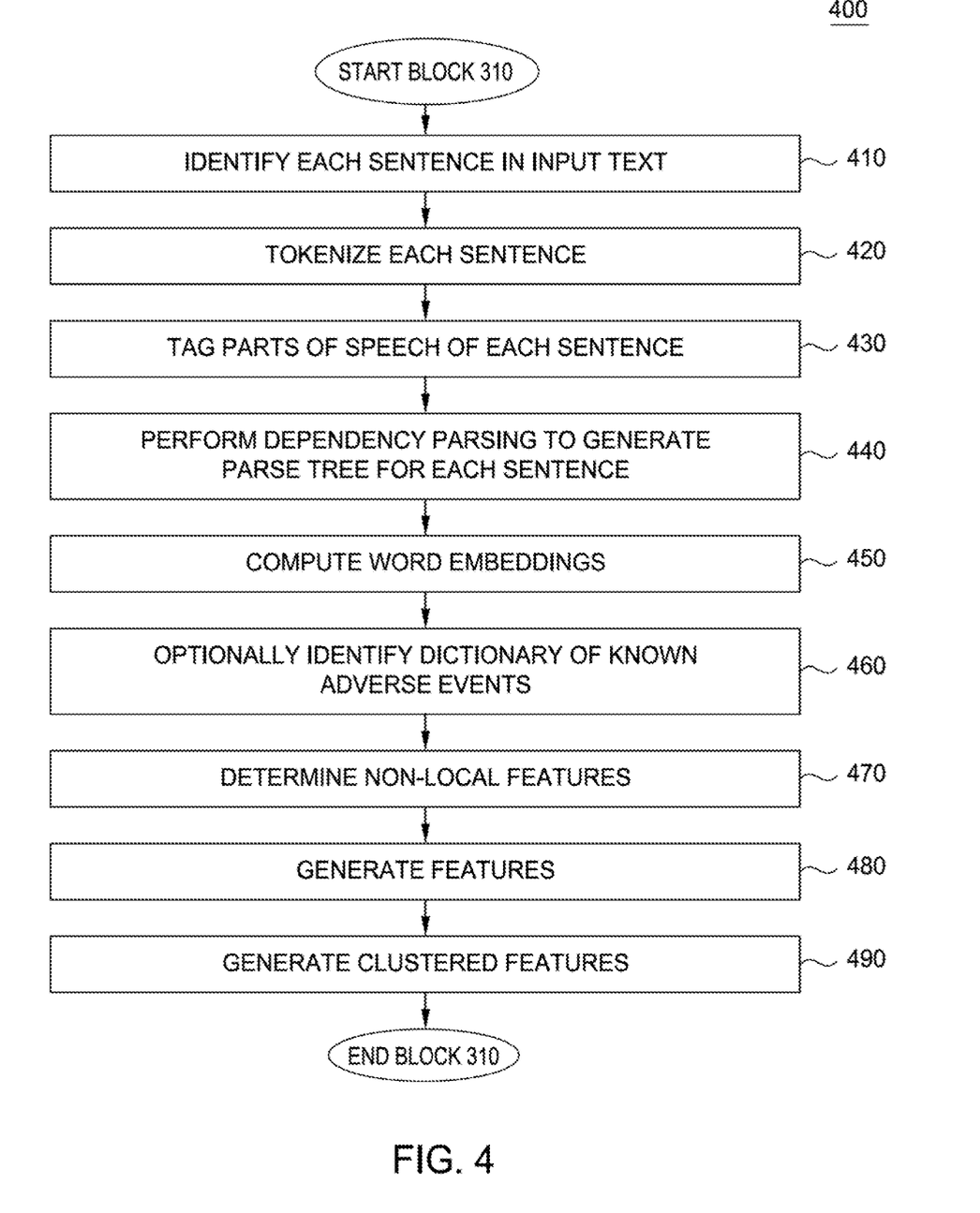
FIG. 4 illustrates a method to preprocess a training corpus to generate features, according to one embodiment.

FIG. 4 illustrates a method 400 corresponding to block 310 preprocess a training corpus to generate features, according to one embodiment. As shown, the method 400 begins at block 410, where one or more NLP algorithms 102 process the text of the training data 105 to identify each sentence therein. In identifying each sentence, the NLP algorithms 102 store an indication of an offset of the start point of the sentence in the text (e.g., a document, email, etc.), and an indication of an offset of the end point of each sentence. At block 420, one or more NLP algorithms 102 tokenize each identified sentence, which turns each character, word, and/or symbol of each sentence into a corresponding token. At block 430, one or more NLP algorithms 102 tag the parts of speech of each sentence. For example, the nouns, verbs, adjectives, etc. of each sentence are identified at block 430. At block 440, one or more NLP algorithms 102 perform dependency parsing on each sentence to generate a parse tree for each sentence. Doing so reflects the dependencies of the words (or tokens) of each sentence.

At block 450, one or more ML algorithms 103 compute word embeddings for each word in each sentence in the text of the training data 105. The word embeddings define a first context for each word based on the context of each word in a given sentence. A second context for each word may further be determined based on the dependency parses performed at block 440. Generally, for each identified sentence, the most frequently occurring dependency patterns are identified based on the parse trees generated at block 440. The ML algorithms 103 may then compute a second word embedding vector for each of the words in the most frequently occurring dependency patterns. At block 460, terms that are defined as adverse events in any dictionaries 107 are identified. At block 470, the event detector 101 determines non-local features for the text. Generally, the non-local features include features that are derived from other mentions of adverse events in other parts of an electronic text document (or from other text documents).

At block 480, one or more features 104 are generated based on the processing performed at blocks 410-480. For example, a first feature 104 may define "drowsy" as an adverse event defined in a dictionary 107. A second feature 104 may determine that "drowsy" has a grammatical relationship with "morning" (e.g., a patient taking a medication is drowsy in the morning, indicating an adverse event). A third feature 104 may be a hybrid feature combining the dictionary 107 definition of "drowsy" as a feature 104, and the grammatical relationship between "drowsy" and "morning". At block 490, one or more clustered features 104 are generated by clustering one or more features determined at block 480. For example, the second word embedding vectors generated for "drowsy" and "morning" (e.g., the hybrid feature) may be clustered by a clustering ML algorithm 103.

The clustering ML algorithm 103 may cluster the second word embedding vectors into example clusters with identifiers 1 and 100. The clustered feature 104 may then be defined based on the cluster identifiers 1 and 100, rather than the terms "drowsy" and "morning", producing a richer, more powerful feature 104. For example, if the terms "not tired" and "evening" may cluster into the identifiers 1 and 100. As such, these terms may be identified as an adverse event in an example sentence that reads "After I take this medicine, I am not tired in the evening", indicating the patient may have difficulty sleeping on the medication.

Figure 5:
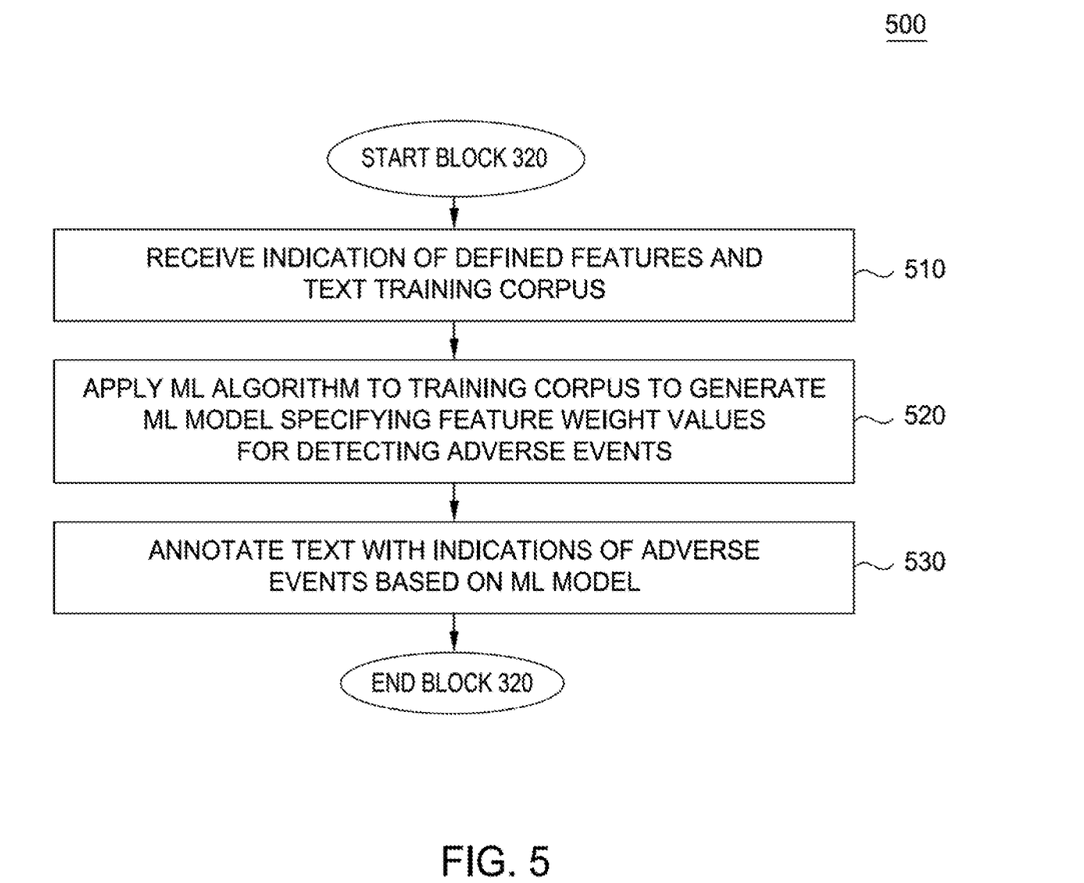
FIG. 5 illustrates a method to train one or more machine learning (ML) models, according to one embodiment.

FIG. 5 illustrates a method 500 corresponding to block 320 to train one or more ML models 106, according to one embodiment. As shown, the method 500 begins at block 510, where the defined features 104 and the text training corpus 105 are received. At block 520, the features 104 and the text training corpus 105 are provided as input to an ML algorithm 103, which generates a ML model 106 specifying weight values for each feature 104 used to detect adverse events in text. Generally, the weight values 104 may be used to compute a score for a given element of text (e.g., a word, phrase, etc.) to determine whether the element of text is an adverse event. For example, a first feature 104, generated based on a pattern in the training data 105, specifies that the term "pain" is an adverse event when associated with the term "severe". The training of the ML model 106 may determine a weight for this association. If text is subsequently received that includes the term "pain" that is associated with "severe," the ML model 106 may apply the corresponding weight to this feature 104, which is present in the received text. As such, a score computed for the text would reflect a greater likelihood that the adverse event of "pain" is present in the text. However, if the term "pain" is not associated with "severe" in the input text, the feature is not present in the input text, and the associated weight is not applied when computing a score for the input text. Therefore, the score would reflect a lesser likelihood (absent other factors) that the term "pain" in the input text is not an adverse event. At block 530, the ML model 106 may optionally be applied to the text of the training data 105 to detect adverse events in the text, and annotate the text to reflect the detected adverse events.

Figure 6:
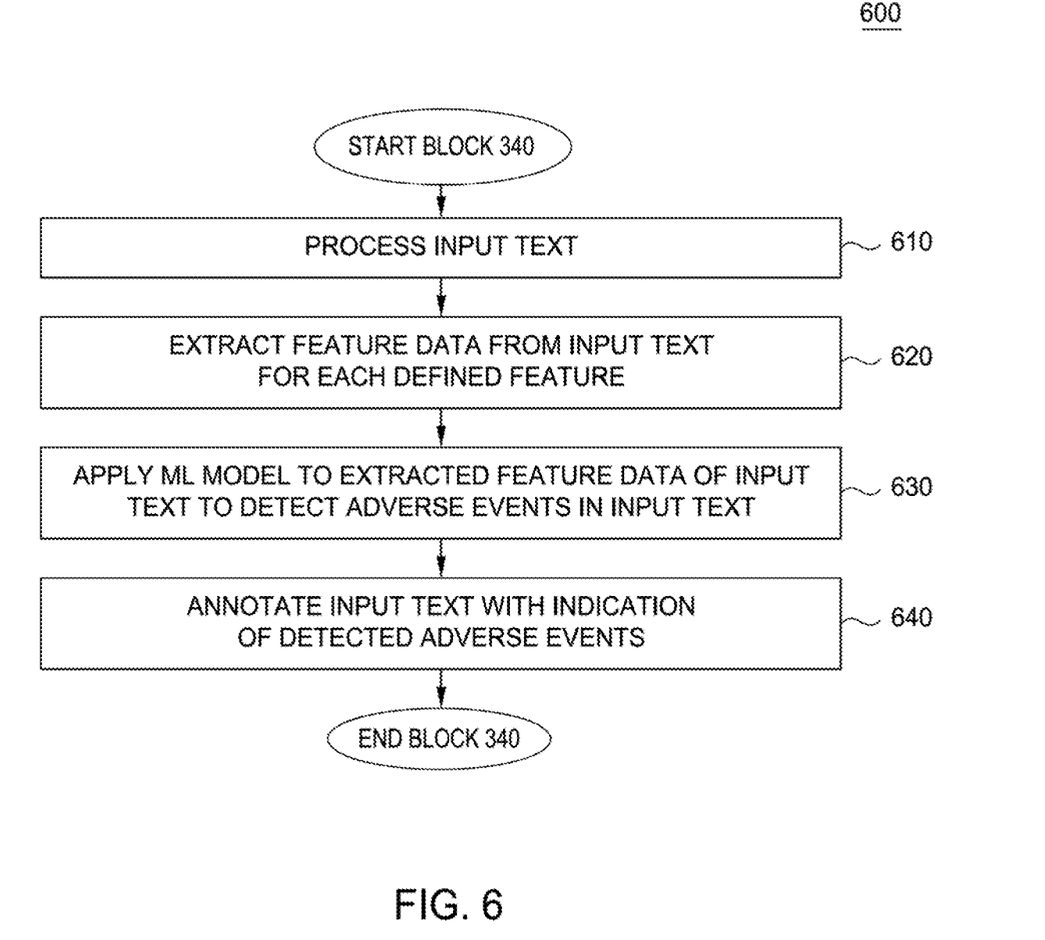
FIG. 6 illustrates a method to apply a ML model to input text to detect and annotate adverse events in the input text, according to one embodiment.

FIG. 6 illustrates a method 600 corresponding to block 340 to apply a ML model to input text to detect and annotate adverse events in the input text, according to one embodiment. As shown, the method 600 begins at block 610, where the NLP algorithms 102 process the input text to identify grammatical and/or linguistic attributes of the input text. Block 610 may include sentence identification, tokenization, generating parse trees, and the like. At block 620, feature data is extracted from the input text for each defined feature 104. The feature data includes one or more word embedding vectors for each token in the sentence, co-occurrence information, and the like. At block 630, one or more ML models 106 are applied to the input text to detect adverse events therein. Generally, the ML models 106 are used to compute scores for each word or group of words in the input text, where the scores reflect whether the word or group of words is an adverse event. If the score exceeds a threshold specified in the ML model 106, the word and/or group of words is identified as an adverse event. At block 640, the input text is annotated with an indication of any detected adverse events. The annotated input text may be stored in the annotated text data 108 for later use.

Figure 7:
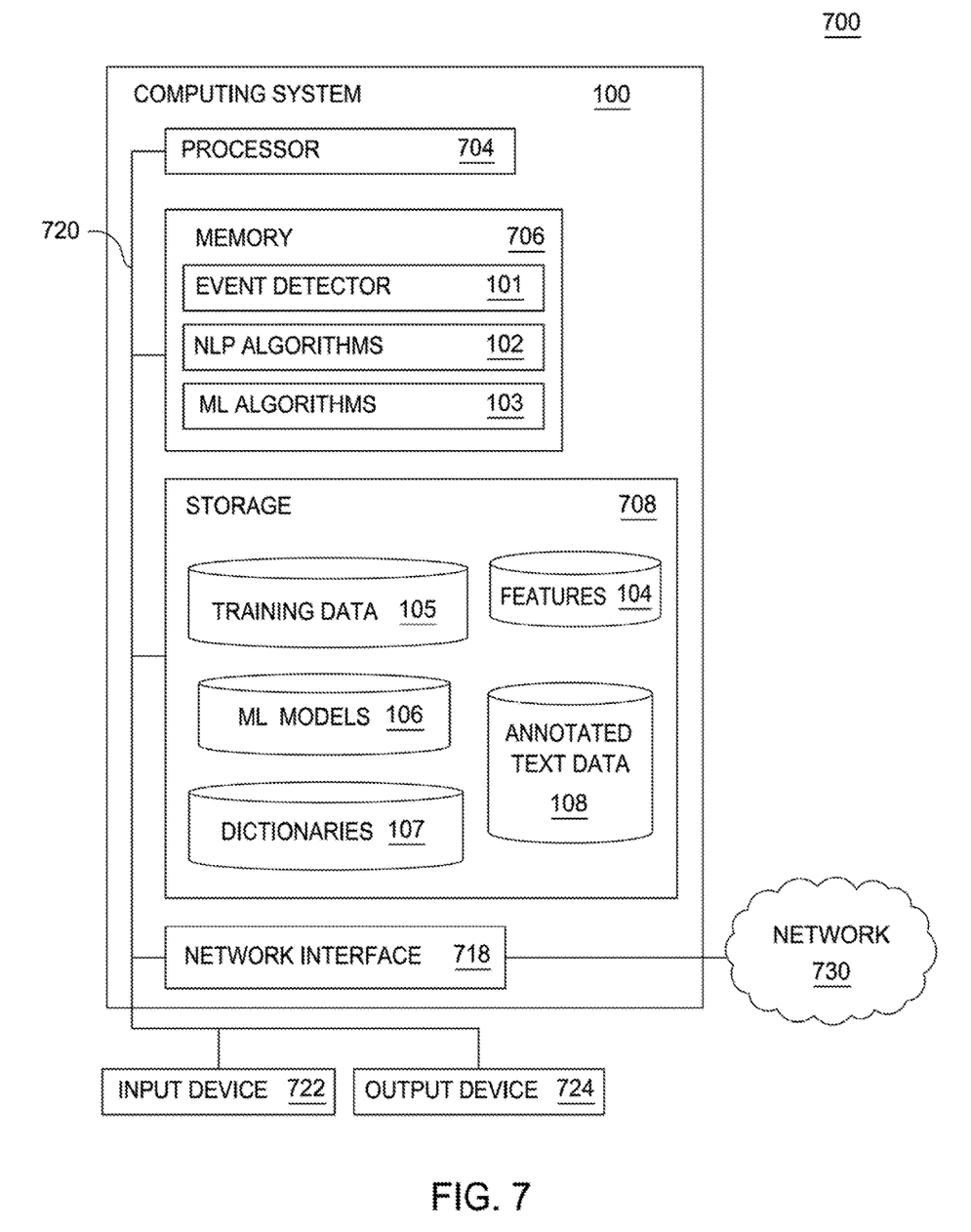
FIG. 7 illustrates a system which applies a cognitive framework to detect adverse events in free-form text, according to one embodiment.

FIG. 7 illustrates a system 700 which applies a cognitive framework to detect adverse events in free-form text, according to one embodiment. The networked system 700 includes the computing system 100. The computing system 100 may also be connected to other computers via a network 730. In general, the network 730 may be a telecommunications network and/or a wide area network (WAN). In a particular embodiment, the network 730 is the Internet.

The computing system 100 generally includes a processor 704 which obtains instructions and data via a bus 720 from a memory 706 and/or a storage 708. The computing system 100 may also include one or more network interface devices 718, input devices 722, and output devices 724 connected to the bus 720. The computing system 100 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computing system 100 to communicate with other computers via the network 730.

The storage 708 is representative of hard-disk drives, solid state drives, flash memory devices, optical media and the like. Generally, the storage 708 stores application programs and data for use by the computing system 100. In addition, the memory 706 and the storage 708 may be considered to include memory physically located elsewhere; for example, on another computer coupled to the computing system 100 via the bus 720.

The input device 722 may be any device for providing input to the computing system 100. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computing system 100. The output device 724 may include output devices such as monitors, touch screen displays, and so on.

As shown, the memory 706 contains the event detector 101, the NLP algorithms 102, and the ML algorithms 103, each described in greater detail above. As shown, the storage 708 contains the features 104, training data 105, ML models 106, dictionaries 107, and the annotated text data 108, each described in greater detail above.

Advantageously, embodiments disclosed herein provide techniques to detect adverse events in unstructured, free-form text. By identifying features common to adverse events specified in text, and generating more generalized features based on a clustering technique, embodiments disclosed herein derive enhanced features that can detect different types of adverse events in text without being explicitly programmed to do so. Doing so improves the functioning of a computing system by allowing the system to more accurately detect adverse events in free-form text.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the event detector 101 could execute on a computing system in the cloud and generate the annotated text data 108 which includes annotations of adverse events in free-form text. In such a case, the event detector 101 could store the annotated text data 108 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:
1. A computer-implemented method, comprising:
    extracting a plurality of grammatical features of a corpus of electronic text data;

generating, based at least in part on the plurality of grammatical features, a plurality of context embedding vectors;

defining a plurality of features in a feature vector based on the plurality of context embedding vectors, comprising:
 clustering the plurality of context embedding vectors, wherein a first feature of the plurality of features is defined based on a dependency between a first term and a second term in the corpus of electronic text data;
 determining a first cluster identifier of a first cluster associated with the first term;
 determining a second cluster identifier of a second cluster associated with the second term; and
 modifying the first feature to specify a dependency between the first and second cluster identifiers;

extracting, from an input comprising unstructured electronic text, a plurality of feature values for the plurality of features defined in the feature vector;

identifying, based on a machine learning (ML) model applied to the plurality of feature values, a portion of the electronic text corresponding to an adverse event; and annotating, by a computer processor, the identified portion of the electronic text with an indication of the adverse event.

2. The computer-implemented method of claim 1, wherein:
 extracting the plurality of grammatical features comprises processing, by a natural language processing (NLP) algorithm, the corpus of electronic text data; and
 generating the plurality of context embedding vectors comprises generating, by a ML algorithm based on the plurality of grammatical features, the plurality of context embedding vectors for the corpus of electronic text data.

3. The computer-implemented method of claim 2, wherein:
 clustering the plurality of context embedding vectors comprises applying a clustering algorithm to the plurality of context embedding vectors to cluster the context embedding vectors into a plurality of clusters;
 the first cluster is assigned to a first context embedding vector of the plurality of context embedding vectors, wherein the first context embedding vector is generated for the first term; and
 the second cluster is assigned to a second context embedding vector of the plurality of context embedding vectors, wherein the second context embedding vector is generated for the second term.

4. The computer-implemented method of claim 3, wherein identifying the portion of the electronic text comprising the adverse event comprises:
 generating a third context embedding vector and a fourth context embedding vector for a first candidate term and a second candidate term, respectively, in the unstructured electronic text;
 clustering, by the clustering algorithm, the third context embedding vector for the first candidate term into the first cluster of the plurality of clusters;
 clustering, by the clustering algorithm, the fourth context embedding vector for the second candidate term into the second cluster of the plurality of clusters; and
 determining, based on the clustering, that the first and second candidate terms include dependency specified by the first modified feature.

5. The computer-implemented method of claim 3, wherein the dependency between the first term and the second term is determined based on a parse tree generated by the NLP algorithm for a first sentence of the corpus of electronic text data.

6. The computer-implemented method of claim 2, further comprising:
 training the ML model based on ML algorithm applied to the defined plurality of features and the corpus of electronic text data.

7. The computer-implemented method of claim 1, wherein the plurality of features are further defined based on: (i) a domain specific feature, (ii) an organizational specific feature, (iii) a plurality of known adverse events specified in a dictionary.

8. A system, comprising:
a processor; and
a memory containing a program which when executed by the processor performs an operation comprising:
 extracting a plurality of grammatical features of a corpus of electronic text data;
 generating, based at least in part on the plurality of grammatical features, a plurality of context embedding vectors;
 defining a plurality of features in a feature vector based on the plurality of context embedding vectors, comprising:
  clustering the plurality of context embedding vectors, wherein a first feature of the plurality of features is defined based on a dependency between a first term and a second term in the corpus of electronic text data:
  determining a first cluster identifier of a first cluster associated with the first term;
  determining a second cluster identifier of a second cluster associated with the second term; and
  modifying the first feature to specify a dependency between the first and second cluster identifiers;
 extracting, from an input comprising unstructured electronic text, a plurality of feature values for the plurality of features defined in the feature vector;
 identifying, based on a machine learning (ML) model applied to the plurality of feature values, a portion of the electronic text corresponding to an adverse event; and
 annotating the identified portion of the electronic text with an indication of the adverse event.

9. The system of claim 8, wherein:
extracting the plurality of grammatical features comprises processing, by a natural language processing (NLP) algorithm, the corpus of electronic text data; and
generating the plurality of context embedding vectors comprises generating, by a ML algorithm based on the plurality of grammatical features, the plurality of context embedding vectors for the corpus of electronic text data.

10. The system of claim 9, wherein:
clustering the plurality of context embedding vectors comprises applying a clustering algorithm to the plurality of context embedding vectors to cluster the context embedding vectors into a plurality of clusters;
the first cluster is assigned to a first context embedding vector of the plurality of context embedding vectors, wherein the first context embedding vector is generated for the first term; and
the second cluster is assigned to a second context embedding vector of the plurality of context embedding vectors, wherein the second context embedding vector is generated for the second term.

11. The system of claim 10, wherein identifying the portion of the electronic text comprising the adverse event comprises:
generating a third context embedding vector and a fourth context embedding vector for a first candidate term and a second candidate term, respectively, in the unstructured electronic text;
clustering, by the clustering algorithm, the third context embedding vector for the first candidate term into the first cluster of the plurality of clusters;
clustering, by the clustering algorithm, the fourth context embedding vector for the second candidate term into the second cluster of the plurality of clusters; and
determining, based on the clustering, that the first and second candidate terms include dependency specified by the first modified feature.

12. The system of claim 10, wherein the dependency between the first term and the second term is determined based on a parse tree generated by the NLP algorithm for a first sentence of the corpus of electronic text data.

13. The system of claim 9, the operation further comprising:
training the ML model based on ML algorithm applied to the defined plurality of features and the corpus of electronic text data.

14. The system of claim 8, wherein the plurality of features are further defined based on: (i) a domain specific feature, (ii) an organizational specific feature, (iii) a plurality of known adverse events specified in a dictionary.

15. A computer program product, comprising:
a non-transitory computer-readable storage medium having computer-readable program code embodied therewith, the computer-readable program code executable by a processor to perform an operation comprising:
extracting a plurality of grammatical features of a corpus of electronic text data;
generating, based at least in part on the plurality of grammatical features, a plurality of context embedding vectors;
defining a plurality of features in a feature vector based on the plurality of context embedding vectors, comprising:
clustering the plurality of context embedding vectors, wherein a first feature of the plurality of features is defined based on a dependency between a first term and a second term in the corpus of electronic text data:
determining a first cluster identifier of a first cluster associated with the first term;
determining a second cluster identifier of a second cluster associated with the second term; and
modifying the first feature to specify a dependency between the first and second cluster identifiers;
extracting, from an input comprising unstructured electronic text, a plurality of feature values for the plurality of features defined in the feature vector;
identifying, based on a machine learning (ML) model applied to the plurality of feature values, a portion of the electronic text corresponding to an adverse event; and
annotating, by a computer processor, the identified portion of the electronic text with an indication of the adverse event.

16. The computer program product of claim 15, wherein:
extracting a plurality of grammatical features comprises processing, by a natural language processing (NLP) algorithm, the corpus of electronic text data; and
generating the plurality of context embedding vectors comprises generating, by a ML algorithm based on the plurality of grammatical features, the plurality of context embedding vectors for the corpus of electronic text data.

17. The computer program product of claim 16, wherein:
clustering the plurality of context embedding vectors comprises applying a clustering algorithm to the plurality of context embedding vectors to cluster the context embedding vectors into a plurality of clusters;
the first cluster is assigned to a first context embedding vector of the plurality of context embedding vectors, wherein the first context embedding vector is generated for the first term; and
the second cluster is assigned to a second context embedding vector of the plurality of context embedding vectors, wherein the second context embedding vector is generated for the second term.

18. The computer program product of claim 17, wherein identifying the portion of the electronic text comprising the adverse event comprises:
generating a third context embedding vector and a fourth context embedding vector for a first candidate term and a second candidate term, respectively, in the unstructured electronic text;
clustering, by the clustering algorithm, the third context embedding vector for the first candidate term into the first cluster of the plurality of clusters;
clustering, by the clustering algorithm, the fourth context embedding vector for the second candidate term into the second cluster of the plurality of clusters; and
determining, based on the clustering, that the first and second candidate terms include dependency specified by the first modified feature.

19. The computer program product of claim 17, wherein the dependency between the first term and the second term is determined based on a parse tree generated by the NLP algorithm for a first sentence of the corpus of electronic text data.

20. The computer program product of claim 16, wherein the plurality of features are further defined based on: (i) a domain specific feature, (ii) an organizational specific feature, (iii) a plurality of known adverse events specified in a dictionary, the operation further comprising:
training the ML model based on ML algorithm applied to the defined plurality of features and the corpus of electronic text data.

* * * * *